United States Patent Office 3,053,828
Patented Sept. 11, 1962

3,053,828
PURIFICATION PROCESS FOR STREPTOMYCIN
Frank Ridgway, Wallasey, England, assignor to The Distillers Company Limited, Edinburgh, Scotland, a British Company
No Drawing. Filed Dec. 2, 1959, Ser. No. 856,667
Claims priority, application Great Britain Jan. 6, 1959
7 Claims. (Cl. 260—210)

The present invention relates to a method for the purification of streptomycin.

It is known that the antibiotic streptomycin possesses a free aldehyde group. Because of this, the compound is able to combine with monoamines or diamines to give Schiff's bases (with primary monoamines) or imidazolidines (with diamines having primary and secondary amine groups on adjacent carbon atoms). Some of these derivatives of streptomycin are sparingly soluble in water and their formation provides a method for the isolation of streptomycin from aqueous liquids containing it, as described for example, in our copending application No. 13142/58, now British Patent No. 846,168.

In order to obtain purified streptomycin from the Schiff's bases or imidazolidines it is necessary to decompose these compounds and to separate the free amine thus formed before recovering the sterptomycin.

Accordingly, the present invention is a process for the purification of streptomycin comprising reacting streptomycin or a salt thereof in aqueous solution with a suitable amine, as hereinafter defined, in the presence of sulphate ions and at a pH value greater than about 7 to produce a sparingly water-soluble Schiff's base or imidazolidine, separating the compound thus formed, mixing with water in the presence of an acid ion exchange resin, preferably in the free acid form, if necessary adding acid until the compound dissolves, separating the exchange resin from the reaction mixture and recovering a purified streptomycin salt from the remaining aqueous solution.

It is necessary that the amine with which the streptomycin is reatced is either a primary monoamine, if a Schiff's base is to be formed, or a diamine having primary or secondary amine groups on adjacent carbon atoms, if an imidazolidine is to be formed, since in the latter case the five-membered imidazolidine ring is formed only when an aldehyde is reacted with such an amine.

An amine is used which gives a sparingly water-soluble derivative which is precipitated from the reaction mixture and is thus purified and is easily recovered.

It is preferred to use primary monoamines having a molecular weight in the range of about 100 to 150, for example 2-phenylethylamine or benzylamine. Such amines give streptomycin Schiff's bases which are relatively insoluble in water but which dissolve readily in water when in contact with the exchange resin, if necessary after the addition of acid.

The Schiff's bases and imidazolidines may be formed in aqueous solution containing an organic solvent such as methanol or isopropanol, if desired. Slightly higher yields of the Schiff's base appear to be obtained with 2-phenylethylamine in the presence of these solvents.

Derivatives of streptomycin with amines or diamines, of higher molecular weight, for example dibenzylethylenediamine, take longer to dissolve than do the derivatives of the amines previously mentioned, when used with commonly available exchange resins such as those referred to later in this specification.

It has been found that the presence of sulphate ions is required before the satisfactory precipitation of the Schiff's base or imidazolidine takes place. This may conveniently be achieved by the addition of a small amount of sulphuric acid or a soluble sulphate to the aqueous solution containing the streptomycin and amine if insufficient sulphate ions are not already present in the reaction mixture.

For satisfactory formation of the Schiff's base or imidazolidine it is necessary to maintain the solution at a pH value greater than about 7.0, and preferably greater than pH 9. Adjustment of pH level may be carried out by addition of alkali such as sodium hydroxide, or of an unreactive amine such as monomethylamine, or by an ion exchange resin such as Amberlite IR-45 (the word "Amberlite" being a registered trademark).

The Schiff's base or the imidazolidine is separated from the solution from which it is precipitated, and is preferably thoroughly washed to remove unreacted amine before further treatment.

The compound is then mixed with water, suitably by slurrying them together, and the ion exchange resin added. Where Schiff's bases of the preferred amines are used an amount of the resin in the range 1 to 2 equivalent has been found satisfactory, but where higher molecular weight amines are used, a larger amount of resin may be required.

The resins used in the process are preferably of the strongly acid type, for example resins which have sulphonic acid groups. Those designated Zeo-Karb 225, Amberlite IR-120 and IR-124 (the word "Zeo-Karb" being a registered trademark) have been found to be suitable. These resins derive their exchange capacity from the sulphonic acid groups of a sulphonated styrene/divinyl benzene copolymer. Such copolymer containing not more than about 25% of divinyl benzene are suitable for use in the process of the present invention although it is preferred to use resins containing between about 9% and 16% divinyl benzene.

Ion exchange resins deriving their exchange capacity from carboxyl groups may also be suitable for use in the present process, for example those sold under the names Amberlite IRC-50, Keo-Karb 226 and Dowex 50 (the name "Dowex" is a registered trademark). Such resins are copolymers of divinyl benzene and methacrylic acid.

When the Schiff's base or imidazolidine is mixed with the exchange resin the addition of a small amount of acid, preferably sulfuric acid may increase the rate of dissolution of the streptomycin derivative. Whether or not the addition of acid is necessary appears to depend upon the purity of the Schiff's base or imidazolidine. Derivatives from fermentation broths usually appear to contain sufficient inorganic cations or salts to allow the derivative to dissolve without the addition of acid. Purer derivatives, however, may require the addition of a small amount of acid.

After the streptomycin derivative has dissolved the mixture is stirred for some time and the resin is separated from the mixture, preferably by filtration or by the use of a centrifuge. The resin is then washed with water and the washings added to the liquid from which the resin was separated.

The aqueous solution of purified streptomycin sulphate thus produced can be purified still further by mixing with more exchange resin of the same type to remove traces of amine still present in the solution. This may be done either batchwise or by passing the solution over a column of the resin.

It is desirable that the streptomycin salt recovered from the purified solution, for example the sulphate, by precipitation or by lyophilization, has a pH value which allows the material to be incorporated into injectable compositions. This can be achieved by adjusting the pH value of the solution to within the range 6.0 to 7.0 by the addition of sulphuric acid or by contacting the solution with an anion exchange resin.

To ensure that the final product is of good colour and high purity it may be necessary to treat the solution with a small proportion of active carbon before recovery.

The recovery of a streptomycin salt from the solution may be carried out by any suitable method, for example the salt may be precipitated by the addition of a non-solvent such as methanol or by lyophilization or by processing to produce the calcium chloride complex, or it may be hydrogenated to give a purified dihydrostreptomycin salt, for example the sulphate.

The amine which is adsorbed on to the resin can be recovered, for example by elution with alkali and an organic solvent such as butanol or isopropanol and distillation, and re-used.

The process of the invention may be carried out as a batch process, or as a continuous process using columns of ion exchange resin.

The following examples describe particular embodiments of the invention.

*Example 1*

Streptomycin-containing fermentation broth was contacted with Amberlite IRC–50 exchange resin, part of which was in the form of the sodium salt.

The resin was then washed with dilute sulphuric acid until an equilibrium pH value in the range 5.0 to 6.5 was reached, thus removing alkali metal ions. Streptomycin was then eluted from the resin with dilute sulphuric acid at an equilibrium pH value in the range 1.8 to 2.2.

The latter eluate was neutralised by contacting it with an anion exchange resin, decolourised with active carbon and concentrated until it contained 125 megaunits of streptomycin in 380 millilitres of solution.

The pH value of the concentrate was then adjusted to pH 8.5 with monomethylamine and a slight excess of 2-phenylethylamine was added to form the Schiff's base. This was then filtered off and mixed with 200 millilitres of Amberlite IR–120 in the free acid form and with 800 millilitres of water and stirred for 2 hours after adjusting the pH value to 8.0 with sulphuric acid. The resin was filtered off and the filtrate mixed with a further 50 millilitres of fresh resin and stirring recommenced. This resin was also filtered off, the resins combined, washed with water and the washings added to the filtrate.

Streptomycin sulphate was recovered from the filtrate by precipitation with methanol, washed, dried and weighed.

The overall recovery of streptomycin sulphate from the eluate from the Amberlite IRC–50 resin was 74%. The residual amine after the second treatment with Amberlite IR–120 was 0.006% w./w. based on streptomycin sulphate.

*Example 2*

The process of Example 1 was repeated using the ion exchange resin Amberlite IR–124 in place of Amberlite IR–120. The overall recovery from the eluate from the Amberlite IRC–50 resin was 80%.

The residual amine after the second treatment with amberlite IR–124 was 0.016% w./w. based on streptomycin sulphate.

*Example 3*

A solution of streptomycin at a concentration of 300,000 units/millilitre was mixed with 1.3 equivalents of benzylamine in aqueous solution in the presence of sulphate ions at a pH value of 8.5 and the mixture was left overnight. The precipitated Schiff's base was filtered off and dried.

Twenty grams of the Schiff's base were stirred with 20 millilitres of Amberlite IR–120 in the free acid form in 100 millilitres of water after adjusting the pH value to 8.0 with sulphuric acid.

The Schiff's base dissolved rapidly and after 2 hours stirring the resin was filtered off and replaced by 10 millilitres of fresh resin and stirring continued. The resin was again filtered off and the resin recovered washed and the washings added to the filtrate.

The amount of residual amine left in the solution after removal of the resin was very small.

*Example 4*

A volume of 450 millilitres of streptomycin sulphate solution 330,000 units/millilitre was adjusted to pH 8.5 using 25% w./v. sodium hydroxide solution and 150 millilitres of isopropanol was added. The mixture was warmed to 40° C. and whilst stirring continuously 0.4 equivalent of 2-phenylethylamine was added at once. Whilst stirring, 0.25% of Schiff's base seed crystals were added and a further 0.9 equivalent of 2-phenylethylamine was slowly added over 1 hour. The mixture was then cooled over 1 hour to a temperature of 20–25° C. The pH value was checked and adjusted to a value of 9.6 using 25% w./v. sodium hydroxide solution. After stirring for a further hour at room temperature the mixture was stored over night in a refrigerator at 5° C. The precipitated Schiff's base was filtered off, washed with 25% v./v. aqueous isopropanol and dried in vacuo. It weighed 202 grams and assayed 677 units/milligram. The recovery over Schiff's base formation was thus 92%.

Sixty gram portions of this Schiff's base were reconverted to streptomycin sulphate using three different resins, namely Amberlite IR–124, Zeo-Karb 225 with 12% divinylbenzene and Zeo-Karb 225 with 16% divinylbenzene (sometimes referred to herein as D.V.B.). In each experiment the Schiff's base was stirred with 65 ml. of resin in the free acid form suspended in 240 ml. of water, and in each case the pH value was adjusted to 8.0 using sulphuric acid. After 6 hours stirring the resin was filtered off and replaced by 16 ml. of fresh resin, stirring being continued for a further 6 hours. After a final filtration and washing of the resin the resulting solutions were assayed for streptomycin and for residual 2-phenylethylamine. The results obtained are shown in the following table:

| Resin Used | Streptomycin Recovery percent from Schiff's Base | Residual 2-phenylethylamine percent w./w. on Streptomycin Sulphate |
| --- | --- | --- |
| Amberlite IR–124 (12% D.V.B.) | 93.5 | Nil |
| Zeo-Karb 225 (12% D.V.B.) | 91.0 | Nil |
| Zeo-Karb 225 (16% D.V.B.) | 99.0 | 0.002 |

*Example 5*

The process described in Example 4 is repeated using the ion exchange resins Zeo-Karb 225 containing respectively 4.5%, 2%, and 1% divinyl benzene.

I claim:

1. A process for the purification of streptomycin comprising reacting together a compound selected from the group consisting of streptomycin and a salt of streptomycin with an amine selected from the group consisting of a primary monoamine and a diamine having amine groups on adjacent carbon atoms in the presence of sulphate ions and at a pH value greater than 7 to produce a sparingly water-soluble compound, separating the compound formed, mixing the compound with water in the presence of an ion exchange resin deriving its exchange capacity from a radical selected from the group consisting of sulphonic and carboxylic acid radicals until the compound dissolves, adsorbing the amine on the resin, separating the resin with adsorbed amine from the mixture and recovering a purified streptomycin antibiotic from the remaining aqueous solution.

2. A process as claimed in claim 1 wherein the amine is selected from the group consisting of 2-phenylethylamine and benzylamine.

3. A process as claimed in claim 1 wherein the amine is reacted with the compound at a pH value greater than 9.

4. A process as claimed in claim 1 wherein the ion exchange resin is a sulphonated co-polymer of styrene and divinyl benzene containing not more than 25% of divinylbenzene.

5. A process as claimed in claim 5 wherein the ion exchange resin contains between about 9% and 16% of divinylbenzene.

6. A process as claimed in claim 1 wherein purified streptomycin is reduced to dihydrostreptomycin and a salt of dihydrostreptomycin is recovered.

7. A process for the purification of streptomycin comprising reacting in the presence of sulphate ions and at a pH value greater than 7 a salt of streptomycin and an amine selected from the group consisting of 2-phenylethylamine and benzylamine to form a sparingly water-soluble Schiff's base, separating Schiff's base, mixing it with water in the presence of an ion exchange resin consisting of a sulphonated co-polymer of styrene and divinylbenzene containing between 9% and 16% divinyl benzene, adding acid, dissolving the Schiff's base, adsorbing the amine on the resin, removing the exchange resin with adsorbed amine and recovering a purified streptomycin antibiotic from the remaining solution.

References Cited in the file of this patent

UNITED STATES PATENTS

| | | |
|---|---|---|
| 2,767,168 | Cheney | Oct. 16, 1956 |
| 2,921,062 | Heuser | Jan. 12, 1960 |